United States Patent
Arbore et al.

(10) Patent No.: US 6,731,660 B2
(45) Date of Patent: May 4, 2004

(54) METHOD FOR TUNING NONLINEAR FREQUENCY MIXING DEVICES THROUGH DEGENERACY

(75) Inventors: Mark A. Arbore, Los Altos, CA (US); Lawrence E. Myers, Palo Alto, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 0 days.

(21) Appl. No.: 09/863,840

(22) Filed: May 22, 2001

(65) Prior Publication Data

US 2002/0176454 A1 Nov. 28, 2002

(51) Int. Cl.[7] .................................................. H01S 3/10
(52) U.S. Cl. ........................................... 372/20; 372/72
(58) Field of Search .......................... 372/20, 23, 100, 372/22, 28, 75, 69–74; 356/450, 454; 307/88.3; 359/330, 326; 358/10

(56) References Cited

U.S. PATENT DOCUMENTS

| | | | |
|---|---|---|---|
| 3,660,673 A | * 5/1972 | Anderson | 307/88.3 |
| 5,321,718 A | * 6/1994 | Waarts et al. | 359/326 |
| 5,499,256 A | * 3/1996 | Bischel et al. | 372/28 |
| 5,513,196 A | * 4/1996 | Bischel et al. | 372/22 |
| 5,800,767 A | 9/1998 | Byer et al. | 264/430 |
| 5,838,720 A | 11/1998 | Morelli | 375/219 |
| 5,875,053 A | 2/1999 | Webjorn et al. | 359/326 |
| 5,912,910 A | 6/1999 | Sanders et al. | 372/22 |
| 6,013,221 A | 1/2000 | Byer et al. | 264/436 |
| 6,028,881 A | * 2/2000 | Ackerman et al. | 372/75 |
| 6,055,250 A | * 4/2000 | Doerr et al. | 372/23 |
| 6,078,704 A | * 6/2000 | Bischel et al. | 385/10 |
| 6,097,487 A | * 8/2000 | Kringlebotn et al. | 356/450 |
| 6,134,250 A | * 10/2000 | Koren et al. | 356/454 |
| 6,282,215 B1 | * 8/2001 | Zorabedian et al. | 372/20 |

(List continued on next page.)

OTHER PUBLICATIONS

M.H. Chou; J. Hauden; M.A. Arbore; M.M. Fejer, "1.5–$\mu$m–band Wavelength Conversioin Based on Difference–Frequency Generation in $LiNbO_3$ Waveguides with Integrated Coupling Structures," Jul. 1, 1998, vol. 23, No. 13.

(List continued on next page.)

*Primary Examiner*—Paul Ip
*Assistant Examiner*—Tuan Nguyen
(74) *Attorney, Agent, or Firm*—Lumen Intellectual Property Services, Inc.

(57) ABSTRACT

A method for tuning nonlinear optical frequency converters including devices such as optical parametric amplifiers and optical parametric oscillators through degeneracy. The nonlinear conversion process is driven by a pump beam at an original pump wavelength and the tuning is accomplished by setting a passband around a first wavelength generated by the optical frequency converter and thereby generating a passband image around a second wavelength. Once the passband and passband image are within a critical range the original pump wavelength is adjusted to an adjusted pump wavelength and tuning continues by moving the passband which the adjusted pump wavelength is either held constant or further adjusted. In particular, the passband can now be moved through the resonant wavelength which corresponds to a point of degeneracy at the original pump wavelength. In some embodiments the critical range commences when the passband overlaps the passband image and the adjusted pump wavelength is selected such that the passband and the passband image do not overlap. Additional margins can be built into the critical range depending on the type of device used for setting the passband, the shape of the passband and the operating characteristics of the optical frequency converter.

34 Claims, 7 Drawing Sheets

U.S. PATENT DOCUMENTS 6,289,028 B1 * 9/2001 Munks et al. .................. 372/20
6,381,256 B1 * 4/2002 Stamm et al. ............... 372/100
6,456,424 B1 * 9/2002 Arbore et al. ............... 359/330
6,526,071 B1 * 2/2003 Zorabedian et al. .......... 372/20

OTHER PUBLICATIONS

I. Brener; M.H. Chou; D. Peale; M.M. Fejer, "Cascaded $_{102}(2)$ Wavelength Converter in $LiNbO_3$ Waveguides with Counter–Propagating Beams," Jul. 8, 1999, vol. 35, No. 14.

M.H. Chou; I. Brener; K.R. Parameswaran; M.M. Fejer, "Stability and Bandwidth Enhancement of Difference Frequency Generation (DFG)–based Wavelength Conversion by Pump Detuning," Jun. 10, 1999, vol. 35, No. 12.

Michael L. Bortz, "Quasi–Phasematched Optical Frequency Conversion in Lithium Niobate Waveguide," 1995.

M.L. Bortz; M. Fujimura; M.M. Fejer, "Increased Acceptance Bandwidth for Quasi–Phasematched Second Harmonic Generation in $LiNbO_3$ Waveguides," Jan. 6, 1994, vol. 30, pp. 34–35.

M.A. Arbore; M.M. Fejer, "Singly Resonant Optical Parametric Oscillation in Periodically Poled Lithium Niobate Waveguides," Feb. 1, 1997, vol. 22, No. 3.

K. Burr; C.L. Tang; Mark Arbore; Martin Fejer, "High–Repetition–Rate Femtosecond Optical Parametric Oscillator Based on Periodically Poled Lithium Niobate," Apr. 23, 1997.

* cited by examiner

METHOD FOR TUNING NONLINEAR FREQUENCY MIXING DEVICES THROUGH DEGENERACY

RELATED APPLICATIONS

This application relates to U.S. Ser. No. 09/863,842 filed on May 22, 2001.

FIELD OF THE INVENTION

The present invention relates generally to a method for tuning nonlinear frequency mixing devices to yield continuous frequency tuning ranges across degeneracy.

BACKGROUND OF THE INVENTION

Light sources are the heart of most modern optics systems. Specifically, tunable light sources exhibiting a wide wavelength range and high output stability are the very foundation of telecommunications networks, optical testing equipment (e.g., swept wavelength testing systems) as well as laser processing tools. Many of these applications require coherent light sources with wide, stable and continuous tuning.

Nonlinear frequency mixing devices are often used to generate light in certain wavelength ranges where suitable laser sources are not available (e.g., due to lack of lasing media generating light in those wavelength ranges at sufficient power levels). Nonlinear frequency mixing is also used for optical signal processing of data-containing signals (e.g., wavelength conversion, chirp reversal, temporal multiplexing and de-multiplexing). Nonlinear optics encompass various processes by which a nonlinear optical material exhibiting a certain nonlinear susceptibility converts input light at an input wavelength to output light at an output wavelength. Some well-known nonlinear processes involving light at two or more wavelengths (e.g., three-wave mixing and four-wave mixing) include second harmonic and higher harmonic generation, difference frequency generation, sum frequency generation and optical parametric generation. The fundamentals of nonlinear optical processes are discussed extensively in literature and the reader is referred to Amnon Yariv, *Quantum Electronics*, $2^{nd}$ edition, Wiley Press, 1967 for general information.

The prior art teaches the use of nonlinear frequency mixers in signal processing. For example, M. H. Chou et al., "1.5-$\mu$m-band wavelength conversion based on difference-frequency generation in $LiNbO_3$ waveguides with integrated coupling structures", Optics Letters, Vol. 23, No. 13, Jul. 1, 1998 teach optical frequency mixing in the 1.5 $\mu$m wavelength band for telecommunication purposes. Additional information related to nonlinear wavelength conversion for communications applications can be found in I. Brenner et al., "Cascaded $\chi^{(2)}$ wavelength converter in $LiNbO_3$ waveguides with counter-propagating beams", Electronics Letters, Vol. 35, No. 14, Jul. 8, 1999; and M. H. Chou et al., "Stability and bandwidth enhancement of difference frequency generation (DFG)-based wavelength conversion by pump detuning", Electronics Letters, Vol. 36., No. 12, Jun. 10, 1999. Though these devices were tunable, none of them operated through degeneracy.

The output light from nonlinear wavelength converters can be tuned over a certain wavelength range. In general, control of the wavelengths of the mixing or interacting input light beams can be used to adjust the output wavelength. When the nonlinear conversion process takes place in materials specially engineered to achieve high nonlinear conversion efficiencies, e.g., materials using quasi-phase-matching (QPM) gratings in in-diffused waveguides, control over certain grating parameters (i.e., the phasematching condition) can be employed to achieve output wavelength tuning. For general information on this subject the reader is referred to Michael L. Bortz's Doctoral Dissertation entitled "Quasi-Phasematched Optical Frequency Conversion in Lithium Niobate Waveguides", Stanford University, 1995 as well as M. L. Bortz et al., "Increased Acceptance Bandwidth for Quasiphasematched Second Harmonic Generation in $LiNbO_3$ Waveguides", Electronics Letters, Vol. 30, Jan. 6, 1994, pp. 34–5. Additional information on devices using QPM gratings for nonlinear conversion is found in U.S. Pat. No. 5,875,053. The processes used to make QPM gratings are described in U.S. Pat. No's. 5,800,767 and 6,013,221, and waveguides with QPM gratings employed for nonlinear optical processes are described in U.S. Pat. No. 5,838,720. Some specific high power pumped mid-IR wavelength systems using non-linear frequency mixing to obtain tunable light sources are taught by Sander et al, in U.S. Pat. No. 5,912,910.

The prior art also teaches the use of nonlinear frequency mixing in light sources. The use of optical parametric oscillators as tunable light sources is discussed by Mark A. Arbore et al. in "Singly resonant optical parametric oscillation in periodically poled lithium niobate waveguides", Optics Letters, Vol. 22, No. 3, Feb. 1, 1997. Also, the use of optical parametric oscillation for producing a tunable, short pulse and high repetition rate light source is taught by Kent Burr et al., "High-repetition-rate femtosecond optical parametric oscillator based on periodically poled lithium niobate", Applied Physics Letters, Vol. 70, 1997, pg. 3343. The tuning bandwidth for the idler beam in Burr's OPO extends from 1.68 $\mu$m to 2.72 $\mu$m and for the signal beam from 1.12 $\mu$m to 1.50 $\mu$m. However, the tuning of nonlinear conversion processes becomes problematic as one approaches degeneracy. Kent Burr et al. avoid degeneracy altogether in operating their OPO and hence do not generate any output in the wavelength range from 1.50 $\mu$m to 1.68 $\mu$m. In other words, they do not provide a light source with a continuous tuning range.

Figure 1:
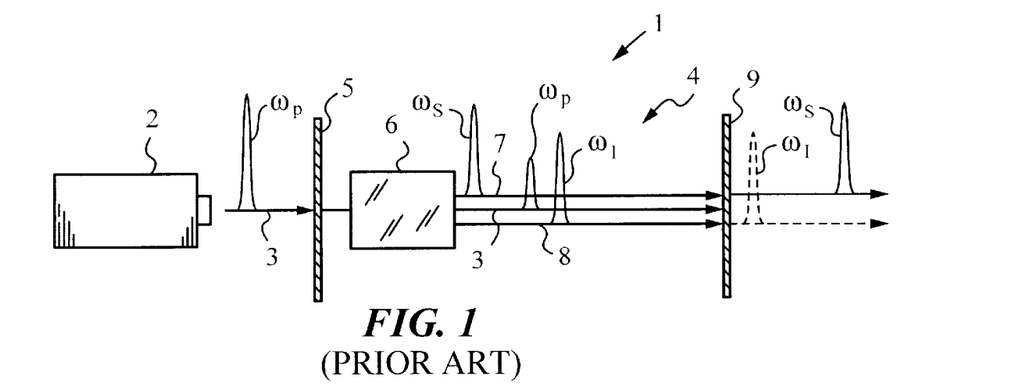
FIG. 1 is a diagram of a prior art optical parametric oscillator.

To better explain the problem of degenerate operation we will initially review a typical optical parametric oscillator (OPO) 1, as shown in FIG. 1. OPO 1 has a tunable laser source 2 for providing a pump beam 3 at a pump frequency $\omega_p$. Pump beam 3 is in-coupled into a cavity 4 through an input coupler 5. Cavity 4 contains an optical parametric amplifier (OPA) 6 which receives pump beam 3 and produces in response a signal beam 7 and an idler beam 8. The output of OPO 1 is outcoupled from cavity 4 through output coupler 9. The output of OPO 1 typically includes at least one of the generated beams, i.e., signal beam 7 and/or idler beam 8. Optical parametric oscillation is supported by cavity 4 in OPA 6 and is a process during which pump beam 3 at pump frequency $\omega_p$ transfers power to signal beam 7 at frequency $\omega_S$ and to idler beam 8 at frequency $\omega_I$ according to the equation:

$$\omega_p = \omega_S + \omega_I.$$

This process is performed such that energy and momentum are conserved between the photons of the three interacting beams, where in the case of quasi-phase-matching (QPM), momentum includes the k vector of the QPM grating. In the case where $\omega_S = \omega_I = \omega_{p/2}$ the OPO is called degenerate and is essentially the opposite of second harmonic generation (SHG), such that:

$\omega_p=2\omega_{p/2}$.

In other words, degeneracy is encountered when frequency $\omega_S$ of signal beam 7 and frequency $\omega_I$ of idler beam 8 are equal to each other, and therefore equal to half of pump frequency $\omega_p$ of pump beam 3 which is driving OPO 1.

Figure 2A:
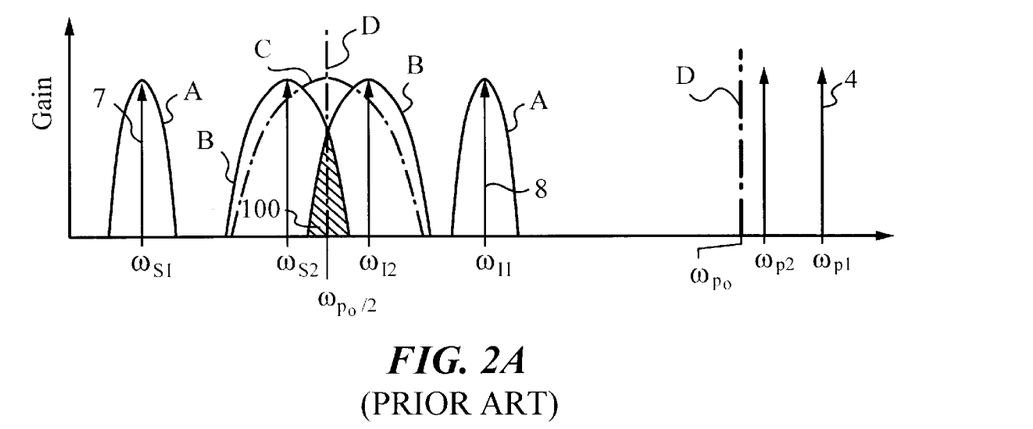
FIGS. 2A–B illustrates the approach to degeneracy and degenerate operation of the prior art optical parametric oscillator of FIG. 1.
Figure 2B:
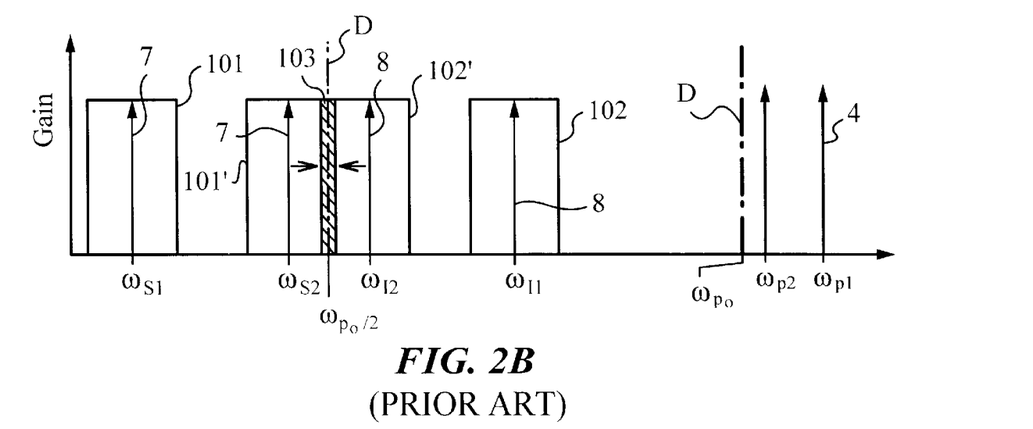

The approach to degeneracy and degeneracy itself are illustrated in FIGS. 2A and B. As seen in FIG. 2A, when pump beam 3 is tuned to a first pump frequency $\omega_{p1}$ it establishes a gain spectrum A in OPA 6 with gain centered at a first signal frequency $\omega_{S1}$ and at a first idler frequency $\omega_{I1}$. Consequently, signal beam 7 and idler beam 8 will experience gain within their respective gain regions of spectrum A and typically contain a range of frequencies within those gain regions. Since the gain regions of spectrum A are far apart (non-overlapping), first signal frequency $\omega_{S1}$ does not at any point overlap with first idler frequency $\omega_{I1}$. It is therefore not possible for the same frequency to act as both signal and idler in this OPO.

As pump beam 3 is tuned to a second pump frequency $\omega p2$, a gain spectrum B is produced with gain centered at a second signal frequency $\omega_{S2}$ and at a second idler frequency $\omega_{I2}$. These two gain regions overlap a frequency range at 100. If OPO cavity 4 resonates frequencies in range 100, then an undesirable double resonance condition occurs in cavity 4 where both signal beam 7 and idler beam 8 resonate. Referring to FIG. 2B, while pump beam 3 is tuned to first pump frequency $\omega_{p1}$ a bandwidth 101 is established, typically with the aid of a filter, within gain spectrum A for signal beam 7. The establishing of bandwidth 101 leads to the establishment of a corresponding mirror or image bandwidth 102 for idler beam 8 in accordance with the equation for OPO. Bandwidth 101 and mirror bandwidth 102 do not overlap. Hence, only signal beam 7 is resonant in cavity 4.

With pump beam 3 tuned to second pump frequency $\omega_{p2}$ bandwidth 101' and mirror bandwidth 102' have an overlap 103. Now, signal beam 7 and idler beam 8 have a tendency to move into overlap 103, as indicated by the arrows and the double resonance condition occurs for signal beam 7 and idler beam 8. The double resonance condition becomes worse as pump beam 3 is tuned closer to a pump frequency $\omega_{po}$ and overlap 103 increases. At degeneracy gain spectrum C for both signal and idler beams 7, 8 is centered at the same wavelength, namely $\omega_{po/2}$ (half the pump frequency) and bandwidth 101 completely overlaps image bandwidth 102. This is the point of mathematical degeneracy indicated in dashed and dotted lines D.

The instability of cavity 4 due to double resonance of signal and idler beams 7, 8 arising due to overlap 103 makes it highly undesirable to tune pump frequency $\omega_p$ and adjust bandwidth 101 in a range in which overlap 103 is significant. Consequently, pump beam 3 is only tuned to within a certain offset from degeneracy. Therefore, a certain range of frequencies for signal and idler beams 7, 8 is not available creating a wavelength "drop out" in the tuning spectrum of OPO 1.

The issues associated with tuning through degeneracy also arise for other nonlinear frequency conversion mechanisms whenever portions of gain or signal or image spectra overlap. Thus, degeneracy causes similar tuning continuity problems in any device relying on nonlinear frequency conversion performed within and/or through degeneracy. As the prior art offers no solution to this problem, there is a need for a corresponding apparatus and technique to permit one to tune light sources using nonlinear frequency conversion elements near as well as through degeneracy.

OBJECTS AND ADVANTAGES

It is therefore a primary object of the present invention to provide a light source using a nonlinear frequency conversion process which is tunable through degeneracy. Specifically, it is the object of the invention to provide a tunable light source which uses an optical parametric oscillator without suffering wavelength "drop out" near and at degeneracy.

It is a second object of this invention to provide a widely tunable optical parametric amplifier or any other suitable nonlinear frequency converter without suffering wavelength "drop out" near and at degeneracy.

This and other objects and advantages of the invention will become apparent upon further reading of the specification.

SUMMARY

The objects and advantages are achieved by a method for tuning nonlinear optical frequency converters, including devices such as optical parametric amplifiers and optical parametric oscillators. In an optical parametric oscillator, which has a parametric amplifier placed inside a cavity, the tuning method involves providing a pump beam at an original pump wavelength to the optical parametric amplifier to produce a gain at a first wavelength and at a second wavelength. A passband is set around the first wavelength thereby generating a passband image around the second wavelength. During tuning, the original pump wavelength is adjusted to an adjusted pump wavelength when the passband is within a critical range of the passband image at said original pump wavelength. Typically, the critical range commences when the passband overlaps the passband image and the adjusted pump wavelength is selected such that the passband and the passband image do not overlap. Additional margins can be built into the critical range depending on the type of device used for setting the passband, the shape of the passband and the operating characteristics of the optical parametric oscillator.

In a preferred embodiment the passband is set by a narrowband tuner such as a diffraction grating filter, a tunable fiber Bragg grating or an etalon filter. These types of narrowband tuners are preferred because they are capable of producing a very narrow passbands as well as larger passbands, e.g., ranging from 0.1 pm up to 1000 pm.

Setting a passband in the cavity establishes a resonant wavelength. It is this resonant wavelength that is typically the output of the optical parametric oscillator. Now, when the passband is moved, the resonant wavelength is tuned. The moving can be performed continuously and it can be performed while the adjusted pump wavelength is held constant. The moving of the passband can also be performed as the adjusted pump wavelength is varied. Once the adjusted pump wavelength is set, the passband is moved such that the resonant wavelength corresponds to a point of degeneracy at the original pump wavelength. In this way, the resonant wavelength or the output of the optical parametric oscillator is tuned across the former point of degeneracy and thus avoids wavelength "drop out" near and at the point of degeneracy.

The optical parametric amplification at the original pump wavelength is phasematched within a phasematching bandwidth. An offset between the original pump wavelength and the adjusted pump wavelength is chosen smaller than the phasematching bandwidth.

In the OPO embodiment the first and second wavelengths can be used interchangeably. For example, the first wavelength can be the signal wavelength and the second wavelength can be the idler wavelength. On the other hand, the first wavelength can be the idler wavelength and the second wavelength can be the signal wavelength. For example, the wavelength assignment will switch while tuning through degeneracy.

The optical parametric oscillator described above can be used in a tunable light source. The method of tuning the optical parametric oscillator ensures that the light source has a continuous tuning range through degeneracy without a wavelength "drop out". The light source has the cavity with the optical parametric amplifier positioned therein and a pump source for providing the pump beam. A spectral control mechanism is used for setting the passband around the first wavelength. As mentioned above, the spectral control can be a narrowband tuner selected among diffraction grating filters, tunable fiber Bragg gratings and etalon filters. A pump tuning mechanism is used to adjust the original pump wavelength to the adjusted pump wavelength. This adjustment is performed when operation at the original pump wavelength brings the passband within the critical range of the passband image.

In a preferred embodiment the tunable light source has a scan control for coordinating the setting of the passband with the adjustment of the original pump wavelength to the adjusted pump wavelength. Conveniently, the scan control is also used for tuning the resonant wavelength of the cavity before the switching to the adjusted pump wavelength.

The tunable light source is further equipped with a phasematching arrangement for phasematching the optical parametric generation taking place in the optical parametric amplifier. For example, the phasematching arrangement includes a quasi-phase-matching (QPM) grating.

The cavity is preferably chosen to avoid large mode-hops and other instabilities to ensure smooth tuning of the resonant wavelength. Preferably, the cavity is a multi-axial-mode cavity and is long. For example, the cavity can have a length of 1 meter or more. In some embodiments, the cavity can include an optical fiber. Conveniently, the cavity can be a ring cavity or a standing wave cavity.

The invention further provides for a method for tuning an optical parametric amplifier through degeneracy. In this case the pump beam is provided at the original pump wavelength to the optical parametric amplifier to produce gain at a first wavelength. Also, an input signal with an input spectrum at the first wavelength is provided. Together, the input spectrum and the original pump wavelength define an image spectrum at a second wavelength within the optical parametric amplifier. When the input spectrum and the image spectrum are within a critical range the original pump wavelength is adjusted to the adjusted pump wavelength. In this embodiment the critical range can be defined to commence when said input spectrum and said image spectrum overlap.

The method for tuning an optical frequency converter can be also practiced by providing to the frequency converter the pump beam to drive the optical frequency conversion. Also, at least one input signal with an input spectrum at a first wavelength is provided to the frequency converter. The input spectrum and the original pump wavelength are used to define an image spectrum at at least one second wavelength. When the input spectrum and image spectrum are within the critical range, the original pump wavelength is changed to the adjusted pump wavelength. In this embodiment the critical range can be defined to commence when the input spectrum and image spectrum overlap. Alternatively, a critical spectrum is defined around the first wavelength, thereby generating a critical spectrum image around the second wavelength. The original pump wavelength is then adjusted to the adjusted pump wavelength when the critical spectrum and critical spectrum image are within critical range.

As will be apparent to a person skilled in the art, the invention admits of a large number of embodiments and versions. The below detailed description and drawings serve to further elucidate the principles of the invention and some of its embodiments.

DETAILED DESCRIPTION

Figure 3:
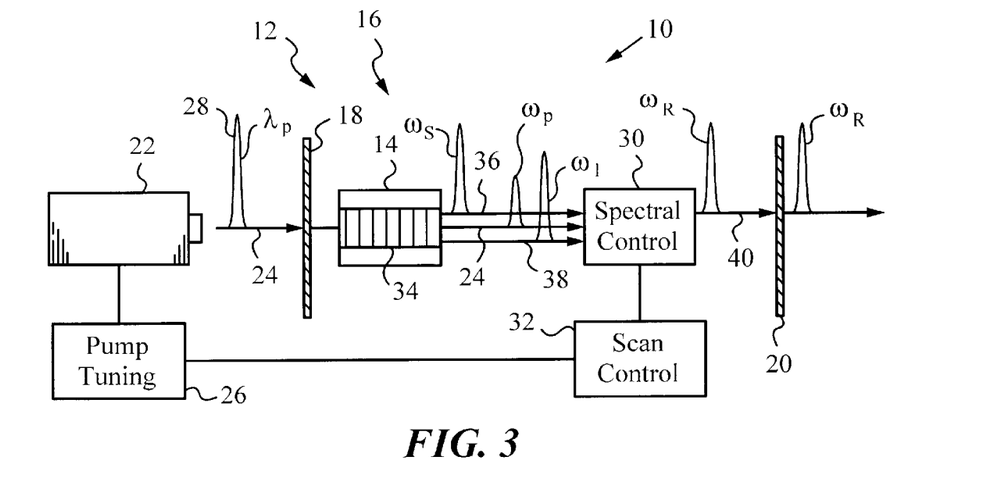
FIG. 3 is a diagram of an optical parametric oscillator according to the invention.

FIG. 3 illustrates a tunable light source 10 using an optical parametric oscillator 12. Optical parametric oscillator 12 has an optical parametric amplifier (OPA) 14 in a cavity 16 delimited by an input coupler 18 and an output coupler 20. OPA 14 is made of a nonlinear optical material selected for its nonlinear susceptibility, i.e., its second order nonlinear susceptibility $\chi^{(2)}$, as well as any other requisite properties required for performing optical parametric amplification. OPA 14 also includes any suitable phasematching arrangement for phasematching the operation of optical parametric amplification within OPA 14. In the present embodiment phasematching arrangement 34 consists of a quasi-phase-matching (QPM) grating. It will be appreciated by a person skilled in the art that phasematching techniques not involving QPM grating 34, e.g., birefringence phase matching or waveguide modal phasematching can be employed for phasematching in OPA 14.

Although in the present case couplers 18, 20 are mirrors, other coupling devices can be used. Cavity 16 is a linear cavity in this embodiment, but a person skilled in the art will appreciate that any cavity capable of supporting optical parametric oscillation can be used. Furthermore, cavity 16 is preferably chosen to avoid large mode-hops and other instabilities. For example, cavity 16 is a multi-axial-mode cavity and has a length of 1 meter or more. In some embodiments, the cavity can include an optical fiber. Conveniently, the cavity is a ring cavity or a standing wave cavity.

Tunable light source 10 has a pump source 22 for providing a pump beam 24 at a pump frequency $\omega_p$ corresponding to a pump wavelength $\lambda_p$. In this embodiment pump beam 24 is pulsed and consists of individual pulses 28 (only one pulse 28 is shown for reasons of clarity). Pump source 22 can be a pulsed laser, e.g., a Q-switched laser able to provide sufficiently high power in pump beam 24, e.g., several hundred miliWatts to several Watts of peak power in each of pulses 28. A person skilled in the art will recognize that it is also possible for pump source 22 to employ a continuous-wave laser, a near-continuous-wave laser or an externally modulated cw laser, provided that it yields sufficient power levels for the frequency conversion operations described below.

Pump source 22 is connected to a pump tuning mechanism 26 for varying pump frequency $\omega_p$. Pump tuning mechanism 26 can be any suitable device capable of controlling the temperature or any other parameter, e.g., cavity length of the laser of pump source 22, to thus tune pump frequency $\omega_p$ of pump beam 24. In the present embodiment pump tuning mechanism 26 can tune pump wavelength $\lambda_p$ of pump beam 24 over a tuning range of about 1.5 nm or more. A person skilled in the art will appreciate that any suitable technique for obtaining this tuning range in pulsed, near-continuous-wave and continuous-wave lasers can be applied to obtain the desired tuning range.

In addition to OPA 14, cavity 16 contains a spectral control mechanism 30. Preferably, spectral control mechanism 30 is a narrowband tuner capable of setting a narrow passband, e.g., in the range of 0.1 pm to 1000 pm. Suitable narrowband tuners are diffraction grating filters, tunable fiber Bragg gratings, dielectric coated mirrors, dielectric coated filters as well as etalon filters.

Tunable light source 10 has a scan control 32 for coordinating the operation of spectral control mechanism 30, in this case narrowband tuner 30, with the operation of pump tuning mechanism 26. Specifically, scan control 32 is provided for coordinating the change in pump wavelength $\lambda_p$ with the setting of the passband.

During operation, tunable light source 10 takes advantage of pump beam 24 input through input coupler 18 into cavity 16 for driving optical parametric oscillator 12. At first, pump source 22 is set by pump tuning mechanism 26 to provide pump beam 24 at an original pump wavelength $\lambda_p$ or pump frequency $\omega_p$. Upon entering cavity 16 pump beam 24 couples into OPA 14 and generates a signal beam 36 at a signal frequency $\omega_S$ and an idler beam 38 at an idler frequency $\omega_I$, in accordance with the equation:

$$\omega_p = \omega_S + \omega_I.$$

As remarked above, this process is performed such that energy and momentum are conserved between the photons of interacting beams 24, 36 and 38, where momentum includes the k vector of QPM grating 34. More specifically, OPA 14 driven by pump beam 24 exhibits gain for signal beam 36 and idler beam 38 at signal and idler frequencies $\omega_S$, $\omega_I$ (or, equivalently, at signal and idler wavelengths $\lambda_S$, $\lambda_I$) within the gain spectra dictated by pump wavelength $\lambda_p$.

Narrowband tuner 30 sets a narrow passband within the gain spectrum for signal or idler beam 36, 38. This narrow passband defines a resonant frequency $\omega_R$ of a resonant beam 40, containing a narrowband portion of either signal beam 36 or idler beam 38 supported by cavity 16. In other words, narrowband tuner 30 rejects one of beams 36, 38 and passes a narrowband portion of the other in the form of resonant beam 40. The choice of which beam to pass will be made based on whether idler beam 38 or signal beam 36 will be used as output of light source 10.

Resonant beam 40 travels through cavity 16 and a small portion, preferably just a few tens of percent of total power in resonant beam 40, is out-coupled through output coupler 20 for the desired application. Except for the out-coupled power, resonant beam 40 is recirculated in cavity 16 to further promote optical parametric oscillation.

Figure 4:
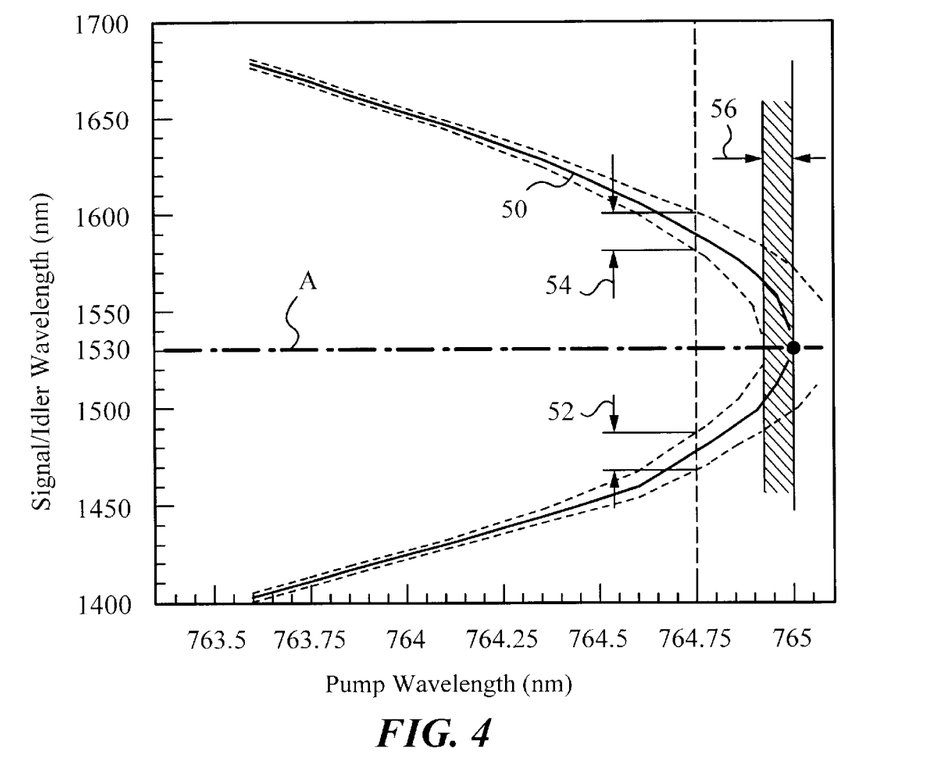
FIG. 4 is a graph illustrating the tuning behavior of the optical parametric oscillator of FIG. 3.

The tuning behavior of optical parametric oscillator 12 is illustrated in wavelengths, rather than frequencies, by graph 50 of FIG. 4. The wavelengths and wavelength ranges indicated in the graph are provided for explanatory purposes and will differ for alternate nonlinear optical materials used in OPA 14 (this plot based on dispersion of $LiNbO_3$). Pump wavelength $\lambda_p$ of pump beam 24 produces gain of which the central 3 dB regions are indicated by 52 and 54 at signal wavelength $\lambda_S$ and idler wavelength $\lambda_I$. In fact, the dashed lines around graph 50 delimit the region of 3 dB gain for optical parametric amplification in OPA 14 and show how its width changes with pump wavelength $\lambda_p$. Line A indicates degeneracy at which signal wavelength $\lambda_S$ and idler wavelength $\lambda_I$ are both equal to 1530 nm. At this point, pump wavelength $\lambda_p$ is equal to 765 nm.

Figure 5A:
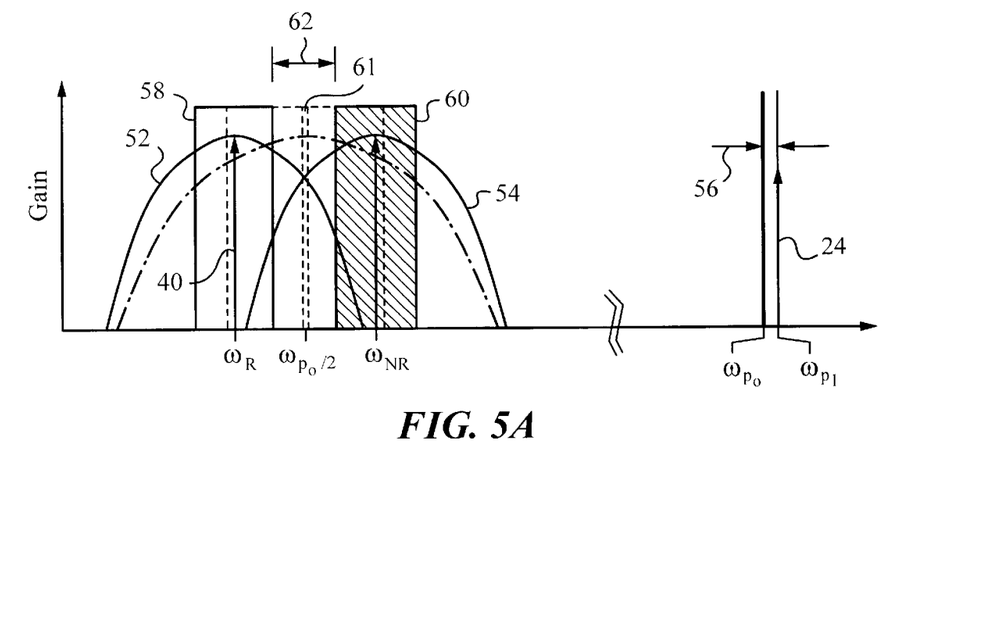
FIGS. 5A–B illustrate the setting of passband and adjustment of the pump wavelength for tuning through degeneracy in accordance with the invention.

In addition to establishing gain at wavelengths $\lambda_S$ and $\lambda_I$ for signal and idler beams 36, 38, light source 10 uses narrowband tuner 30 to set a passband 58 around one of these wavelengths. In this case, as illustrated in FIG. 5A, passband 58 is set around resonant wavelength $\lambda_R$ or resonant frequency $\omega_R$ corresponding to a portion of signal beam 36 passed through passband 58. The setting of passband 58 results in the generation of a passband image 60 around idler frequency $\omega_I$, in this case corresponding to a non-resonant frequency $\omega_{NR}$.

When an original pump wavelength $\lambda_{p1}$ more conveniently shown in FIG. 5A as original pump frequency $\omega_{p1}$ is set by pump tuning mechanism 26 within a region 56 conveniently defined as at degeneracy (also see FIG. 4), gain 52, 54 at resonant and non-resonant wavelengths or frequencies ($\omega_R$, $\omega_{NR}$) begins to overlap. Strictly speaking, mathematical degeneracy takes place for pump frequency $\omega_{po}$. However, before this mathematical degeneracy is reached, passband 58 and passband image 60 start approaching each other to within a critical range 62. By the time passband 58 and passband image 60 begin to overlap at 61 double resonance at resonant and non-resonant frequencies $\omega_R$, $\omega_{NR}$ occurs in cavity 16 (in other words, frequency $\omega_{NR}$ becomes resonant). Hence, the prior art teaches to avoid tuning pump source 22 to any pump wavelength or pump frequency within region 56. Thus, the prior art accepts a wavelength "drop out" in the tuning range of resonant frequency $\omega_R$ or resonant wavelength $\lambda_R$ of resonant beam 40.

Figure 5B:
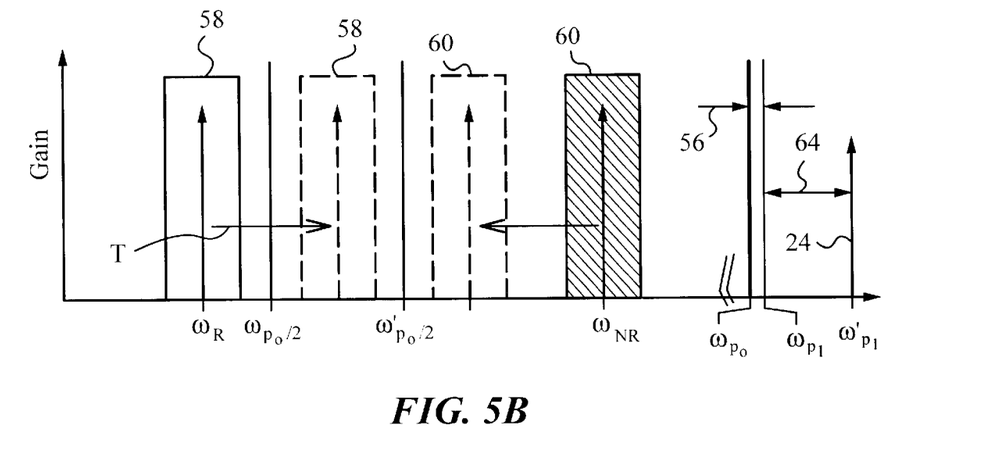

In contrast, tunable light source 10 avoids the wavelength "drop out" in the tuning range of resonant beam 40 by adjusting original pump wavelength $\lambda_{p1}$ or original pump frequency $\omega_{p1}$ when passband 58 is within critical range 62 of passband image 60. Specifically, original pump frequency $\omega$ is adjusted by an offset 64 to an adjusted pump frequency $\omega'_{p1}$, as indicated in FIG. 5B. For better visualization, offset 64 is shown considerably larger than in practice.

In one embodiment critical range 62 is defined to commence when passband 58 overlaps passband image 60. In other embodiments, critical range 62 can be enlarged or made smaller depending on the type of narrowband tuner 30 used for setting passband 58. For example, when passband 58 has a gaussian shape, rather than the idealized step shape shown, critical range 62 can be defined to commence when the overlap between passband 58 and passband image 60 is a few percent. In cases where passband 58 is not stable (e.g., when passband 58 exhibits fluctuations) critical range 62 can be set to commence much before overlap between passband 58 and passband image 60 occurs. A person skilled in the art will appreciate that critical range 62 is preferably determined in practice by adjusting passband 58 and observing when light source 10 starts exhibiting unacceptable deterioration in outcoupled resonant beam 40 due to double resonance within cavity 16.

In adjusting original pump wavelength $\lambda_{p1}$ to adjusted pump wavelength $\lambda'_{p1}$ offset 64 is selected such that passband 58 and passband image 60 do not overlap. In practical cases this means that offset 64 can typically be between a few pm and 100 pm or even more. In fact, preferably, offset 64 is selected large enough such that passband 58 and passband image 60 are separated by a distance considerably larger than critical range 62, as shown in FIG. 5B. Most preferably offset 64 is selected based on the amount by which adjusted pump wavelength $\lambda'_{p1}$ or adjusted pump frequency $\omega'_{p1}$ moves mathematical degeneracy. Specifically, offset 64 is selected such that there is considerable separation, e.g., on the order of several widths of passband 58, between mathematical degeneracy $\omega'_{po/2}$ at adjusted pump frequency $\omega'_{p1}$ and mathematical degeneracy $\omega_{po/2}$ at original pump frequency $\omega_{p1}$.

After adjustment to adjusted pump wavelength $\lambda'_{p1}$ passband 58 defining resonant frequency $\omega_R$ can be moved through former point of degeneracy at $\omega_{po/2}$, as indicated by arrow T. Passband 58 and passband image 60 migrate to meet up again during this tuning, as indicated in dashed lines. When offset 64 is sufficiently large, passband 58 and passband image 60 will not come within critical range 62 before passband 58 moves through former point of degeneracy at $\omega_{po/2}$. In this manner resonant frequency $\omega_R$ of resonant beam 40 can be tuned through degeneracy and the wavelength "drop out" is circumvented.

Adjustment of passband 58 to tune resonant wavelength $\lambda_R$ is performed by narrowband tuner 30 under the direction of scan control 32 and in coordination with pump tuning mechanism 26. In accordance with one embodiment of the invention, once adjusted by offset 64 adjusted pump wavelength $\lambda'_{p1}$ is held constant by pump tuning mechanism 26 and only passband 58 is moved continuously to tune resonant wavelength $\lambda_R$ through degeneracy. In accordance with another embodiment, passband 58 is moved while adjusted pump wavelength $\lambda'_{p1}$ is concurrently tuned. In each case, scan control 32 controls and coordinates this tuning process as well as the tuning process of the resonant wavelength $\lambda_R$ over the entire tuning range of tunable light source 10.

Figure 6:
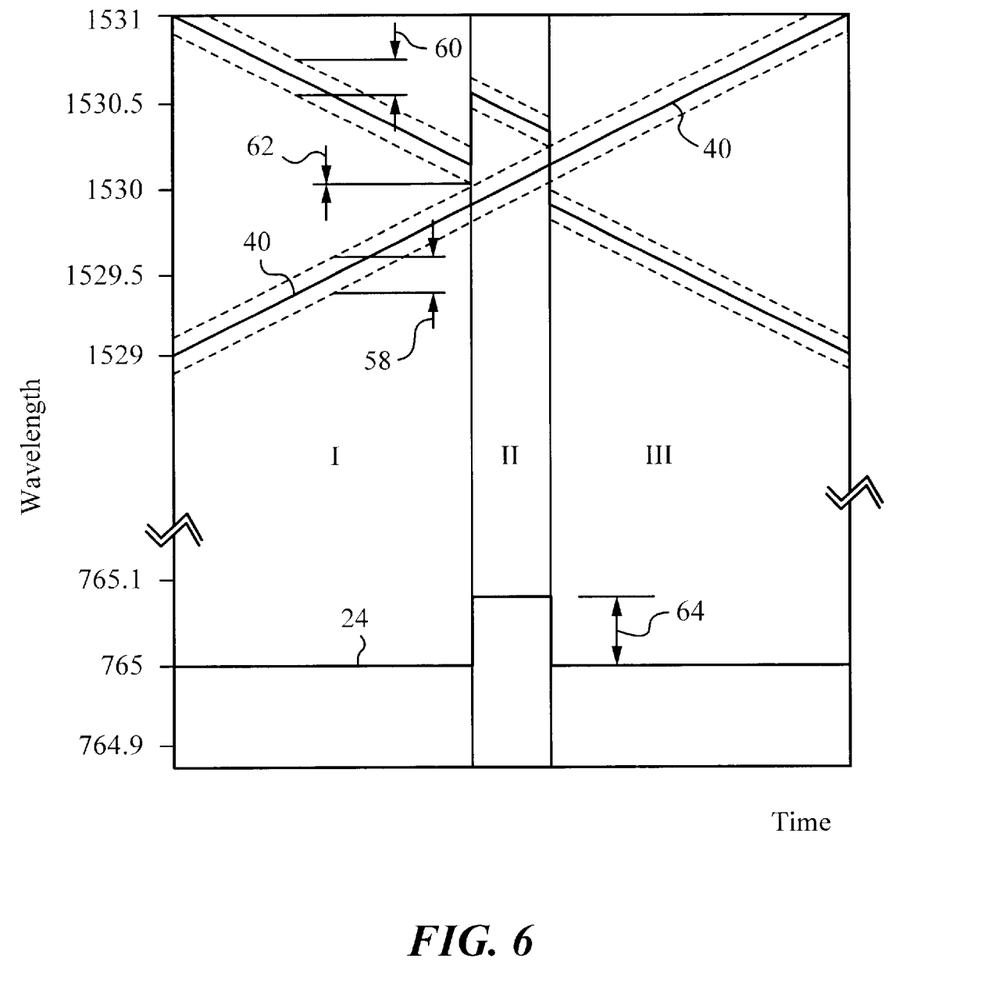
FIG. 6 is a graph of a preferred wavelength tuning process in accordance with the invention.

A preferred program run by scan control 32 for tuning resonant wavelength $\lambda_R$ through degeneracy is illustrated in FIG. 6. Pump beam 24 is initially set at an original pump wavelength $\lambda_{p1}$ very close to mathematical degeneracy at 765 nm. At this setting passband 58 defines resonant beam 40 with resonant wavelength $\lambda_R$ corresponding to a wavelength of signal beam 36. Passband 58 is moved continuously through region I from 1529nm to a point at which passband 58 and passband image 60 are within critical range 62. In this case, critical range 62 commences with overlap between passband 58 and passband image 60.

Before entering region II, original pump wavelength $l_{p1}$ is adjusted by offset 64 to adjusted pump wavelength $l'_{p1}$, thus separating passband 58 and passband image 60. Passband 58 is now tuned in region II while adjusted pump wavelength $l'_{p1}$ is held constant. When passband 58 and passband image 60 are within critical range 62, pump wavelength is once again adjusted to original pump wavelength $l_{p1}$. Tuning then continues in region III. It is noted that no discontinuity exists in resonant wavelength $l_R$ during tuning from region I to II and ultimately III. Hence, no wavelength "drop out" is experienced by light source 10. It should also be noted that in region III resonant wavelength $l_R$ corresponds to a wavelength of idler beam 38.

Figure 7:
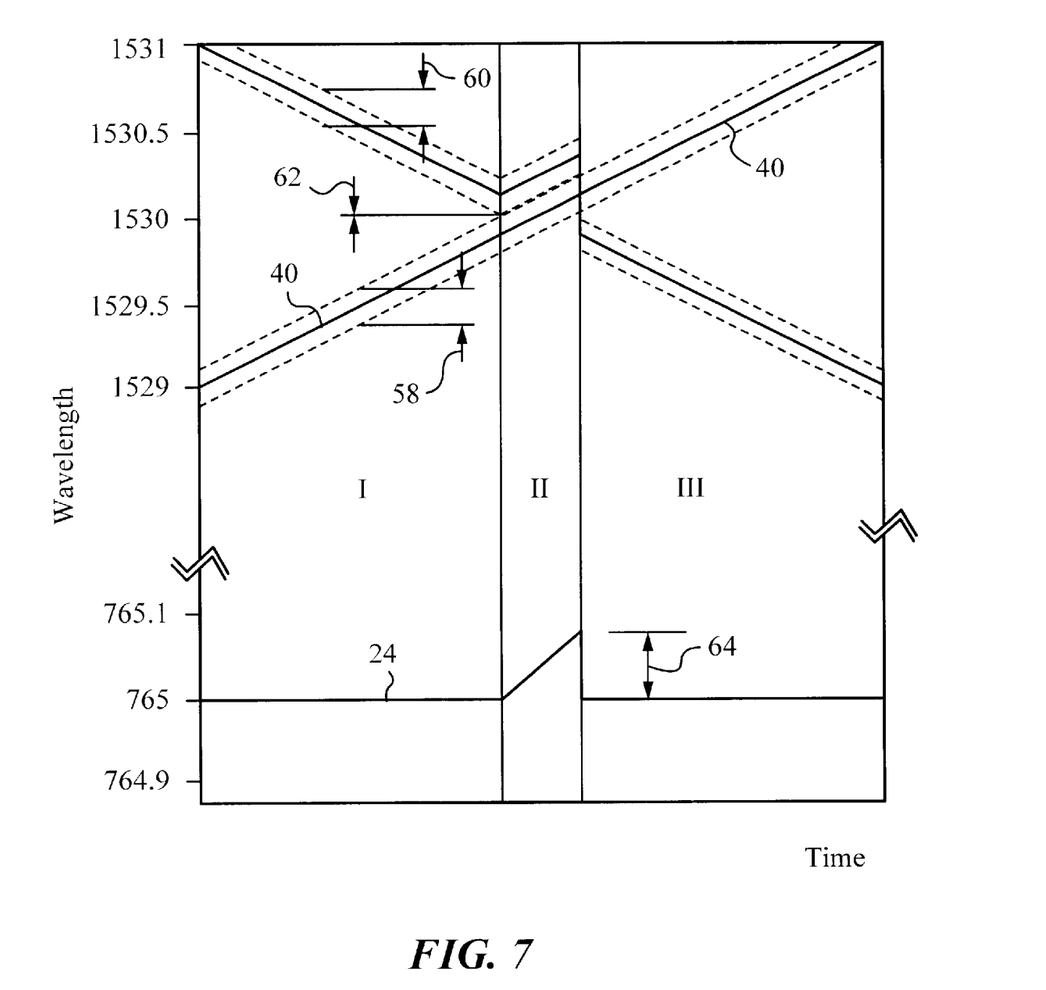
FIG. 7 is a graph of another wavelength tuning process in accordance with the invention.

Another program to be run by scan control 32 to tune resonant wavelength $\lambda_R$ through degeneracy is shown in FIG. 7. In this case the tuning in region I proceeds as in the preferred embodiment. In region II pump beam wavelength is continuously adjusted up to the value of offset 64 while passband 58 is moved. The adjustment is performed such that passband 58 and image passband 60 do not overlap at any time in region II. In region III tuning proceeds as in the preferred embodiment.

Figure 8:
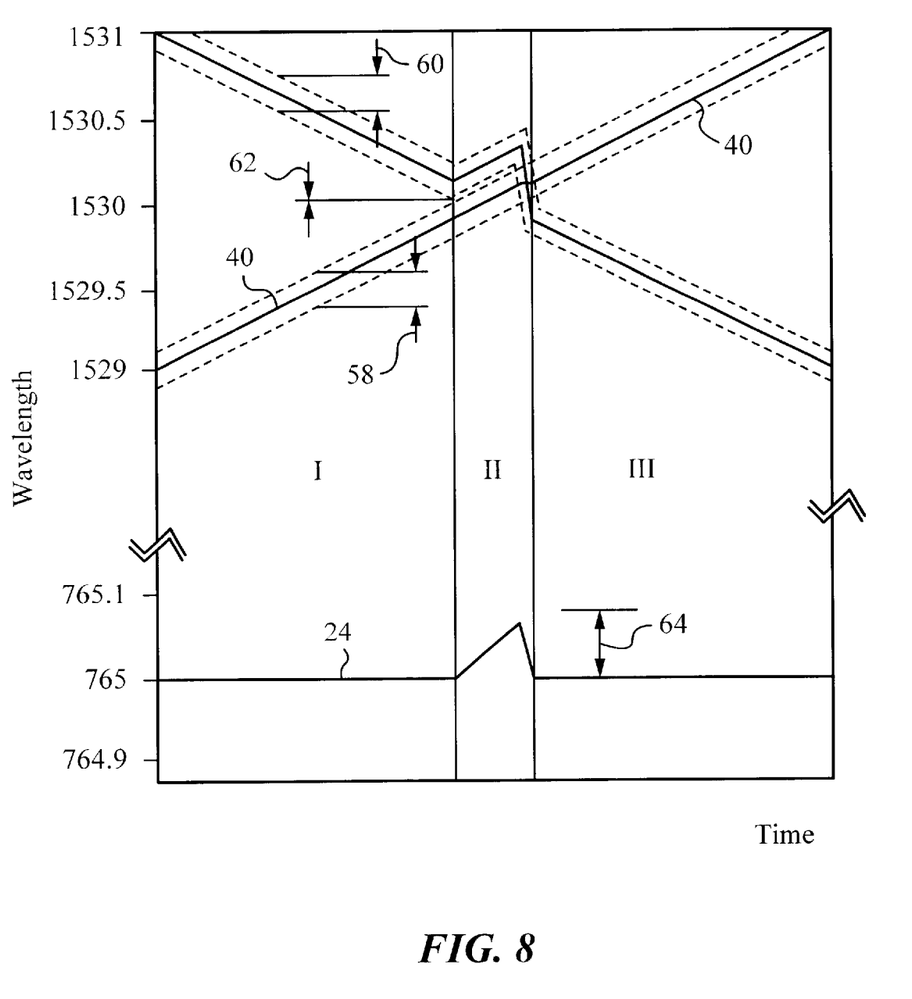
FIG. 8 is a graph of yet another wavelength tuning process in accordance with the invention.

Yet another program for tuning resonant wavelength $\lambda_R$ is illustrated in FIG. 8. Tuning in regions I and III is performed as in the preferred embodiment. In region II tuning is performed as in the embodiment in FIG. 7 up to a point at which passband 58 and passband image 60 are allowed to overlap for a very short period while resonant wavelength $\lambda_R$ is held constant as pump wavelength is adjusted. From these examples, a person skilled in the art will recognize that many different schemes for tuning light source 10 through degeneracy can be devised based on the principles of the invention.

Tunable light source 10 using OPO 12 thus interchanges signal and idler wavelengths while tuning through degeneracy. In performing the tuning it is preferable that QPM grating 34 have a phasematching bandwidth for optical parametric amplification selected to phasematch the optical parametric generation at original pump wavelength $\lambda_{p1}$. Offset 64 should be well within the phasematching bandwidth of QPM grating 34 in order for light source 10 to operate efficiently. In any event, offset 64 should be smaller than the phasematching bandwidth.

It is also preferable that cavity 16 be long enough, as mentioned above, to avoid tuning discontinuities associated with mode-hopping. In some embodiment, cavity 16 can include a long fiber section, e.g., longer than 1 meter to accomplish this goal. A person skilled in the art will recognize how to adapt cavity 16 to obtain smooth and continuous tuning of resonant wavelength $\lambda_R$.

The use of an optical parametric oscillator, as described above, is only one particular embodiment of the invention. A person skilled in the art will recognize that the method of invention for tuning through degeneracy can be applied to nonlinear frequency converters in general. For example, it can be applied to nonlinear frequency converters which generate two or more output wavelengths by setting an appropriate passband around one of the wavelengths and tuning through degeneracy, i.e., when the gains for the two output wavelengths overlap, in accordance with the method of invention.

Figure 9:
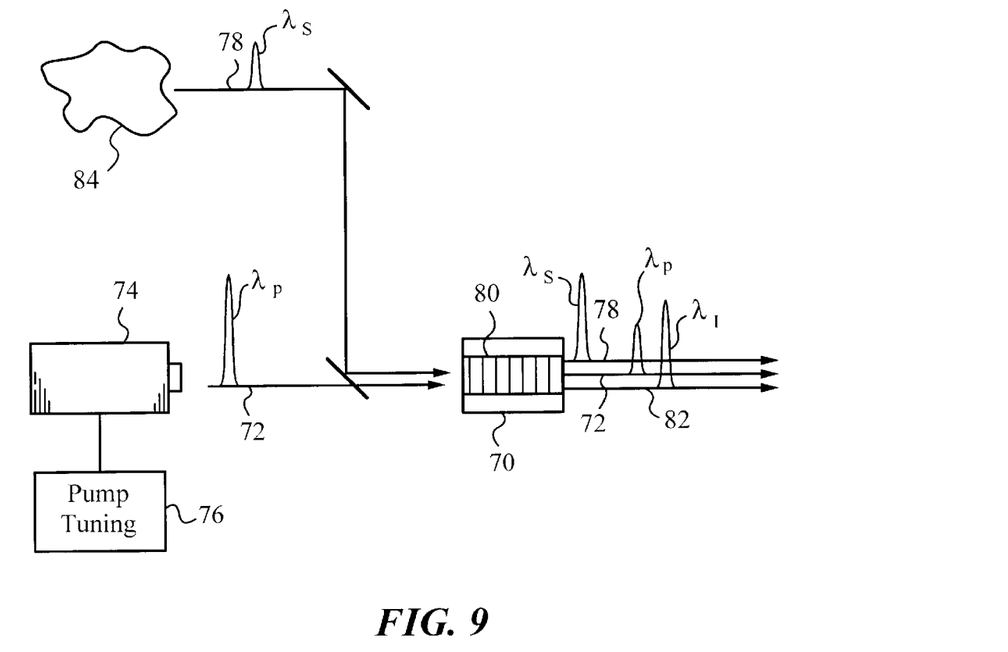
FIG. 9 is a diagram of an optical parametric amplifier in accordance with the invention.

FIG. 9 illustrates an optical parametric amplifier 70 set up to perform optical parametric amplification. A pump beam 72 at an original pump wavelength $\lambda_{p1}$ is provided from a tunable pump source 74. A pump tuning and spectrum control unit 76 is connected to pump source 74 to control the tuning of pump wavelength and an input spectrum of pump beam 72. A signal beam 78 at a signal wavelength $\lambda_s$ to be amplified is also provided from a signal source 84, e.g., from an optical network.

Optical parametric amplifier 70 has a QPM grating 80 for quasi-phase-matching optical parametric amplification. In accordance with the above-described principles, input beams 72 and 78 produce a three-wave mixing operation resulting in the output of pump beam 72, amplified signal beam 78 and an idler beam 82 at an idler wavelength $\lambda_I$. Pump beam 72 drives the optical parametric amplification by producing gain at both signal and idler wavelengths $\lambda_s$, $\lambda_I$. As better illustrated in FIG. 10, input spectrum 88 can have any arbitrary shape.

Figure 10:
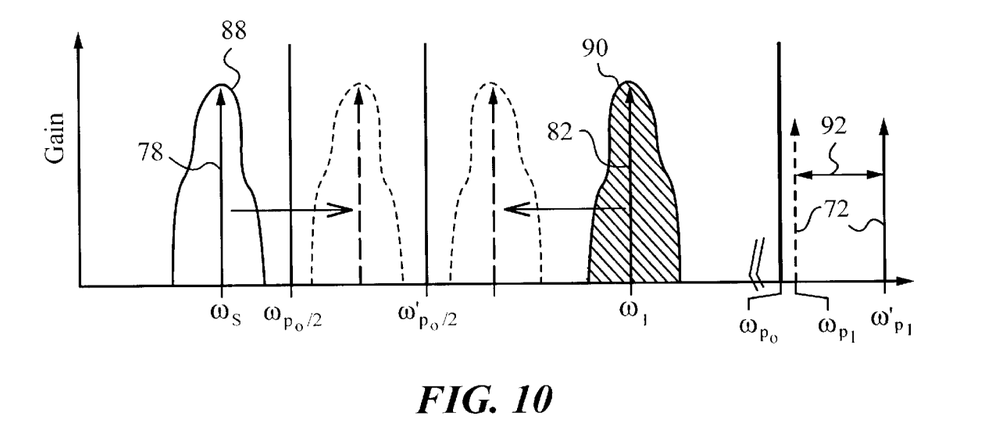
FIG. 10 illustrates the tuning of the input spectrum and image spectrum in the optical parametric amplifier of FIG. 9.

Pump beam 72 at an original pump wavelength $\lambda_{p1}$ in conjunction with signal beam 78 having input spectrum 88 determine an image spectrum 90 established around idler wavelength $\lambda_I$. (Note that FIG. 10 presents all data in terms of frequencies rather than wavelengths for clearer visualization). In accordance with the invention, when input spectrum 88 and image spectrum 90 are within a critical range original pump wavelength $\lambda_{p1}$ is adjusted by an offset 92 to adjusted pump wavelength $\lambda'_{p1}$. After this adjustment, any of the above-described tuning programs can be used to move input spectrum 88 and, if desired further vary adjusted pump wavelength $\lambda'_{p1}$, to tune through former degeneracy.

In this embodiment the critical range is defined to commence when input spectrum 88 and image spectrum 90 overlap. Of course, critical range can also be larger or smaller, depending on desired performance of optical parametric amplifier 70 and as discussed above.

The method of the invention can thus be used in general for tuning any nonlinear optical frequency converter, of which OPA 70 is one example. When tuning nonlinear optical frequency a spectral control mechanism, as described above, can be used to set the passband around or define a critical spectrum around at least one of the wavelengths produced in the nonlinear conversion process. Defining the critical spectrum will generate a critical spectrum image around a second wavelength. The original pump wavelength is then adjusted to an adjusted pump wavelength when the critical spectrum and critical spectrum image are within a critical range.

Although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A method of tuning an optical parametric oscillator comprising:
    a) placing an optical parametric amplifier in a cavity;
    b) providing a pump beam at an original pump wavelength to said optical parametric amplifier to produce gain at a first wavelength and at a second wavelength;
    c) setting a passband around said first wavelength, thereby generating a passband image around said second wavelength; and
    d) adjusting said original pump wavelength to an adjusted pump wavelength when said passband is within a critical range of said passband image at said original pump wavelength.

2. The method of claim 1, wherein said passband is set by a narrowband tuner.

3. The method of claim 1, further comprising moving said passband, thereby tuning a resonant wavelength of said cavity contained within said passband.

4. The method of claim 3, wherein said moving is continuous.

5. The method of claim 3, wherein said moving is performed while said adjusted pump wavelength is constant.

6. The method of claim 3, wherein said moving is performed while said adjusted pump wavelength is varied.

7. The method of claim 3, wherein said passband is moved such that said resonant wavelength corresponds to a point of degeneracy at said original pump wavelength.

8. The method of claim 3, further comprising phasematching said optical parametric amplification within a phasematching bandwidth for said original pump wavelength, whereby an offset between said original pump wavelength and said adjusted pump wavelength is smaller than said phasematching bandwidth.

9. The method of claim 1, wherein said critical range commences when said passband overlaps said passband image.

10. The method of claim 1, wherein said adjusted pump wavelength is selected such that said passband and said passband image at said adjusted pump wavelength do not overlap.

11. The method of claim 1, wherein said first wavelength is a signal wavelength and said second wavelength is an idler wavelength.

12. The method of claim 1, wherein said first wavelength is an idler wavelength and said second wavelength is a signal wavelength.

13. A tunable light source having a continuous tuning range, said tunable light source comprising:
    a) a cavity;
    b) an optical parametric amplifier positioned in said cavity;
    c) a pump source for providing a pump beam at an original pump wavelength to said optical parametric amplifier to produce gain at a first wavelength and at a second wavelength;
    d) a spectral control means for setting a passband around said first wavelength, thereby generating a passband image around said second wavelength; and
    e) a pump tuning means for adjusting said original pump wavelength to an adjusted pump wavelength when said passband is within a critical range of said passband image at said original pump wavelength.

14. The tunable light source of claim 13, further comprising a scan control for coordinating the setting of said passband with the adjustment of said original pump wavelength to said adjusted pump wavelength.

15. The tunable light source of claim 13, wherein said spectral control means is a narrowband tuner.

16. The tunable light source of claim 15, wherein said narrowband tuner comprises an element selected from the group consisting of a diffraction grating filter, a tunable fiber Bragg grating, dielectric coated mirrors, dielectric coated filters and an etalon filter.

17. The tunable light source of claim 15, wherein the width of said passband ranges from 0.1 pm to 1000 pm.

18. The tunable light source of claim 13, further comprising a phasematching arrangement in said optical parametric amplifier for phasematching said optical parametric amplification within a phasematching bandwidth, whereby an offset selected between said pump wavelength and said adjusted pump wavelength is smaller than said phasematching bandwidth.

19. The tunable light source of claim 18, wherein said phasematching arrangement comprises a quasi-phasematching grating.

20. The tunable light source of claim 13, wherein said cavity comprises a multi-axial-mode cavity.

21. The tunable light source of claim 20, wherein said cavity has a length of at least 1 meter.

22. The tunable light source of claim 20, wherein said cavity comprises an optical fiber.

23. The tunable light source of claim 20, wherein said cavity is selected from the group consisting of a ring cavity and a standing wave cavity.

24. A method of tuning a nonlinear optical frequency converter comprising:
   a) providing a pump beam at an original pump wavelength to said nonlinear optical frequency converter to produce output at at least one of a first wavelength and a second wavelength;
   b) defining a critical spectrum around said first wavelength, thereby generating a critical spectrum image around said second wavelength; and
   c) adjusting said original pump wavelength to an adjusted pump wavelength when said critical spectrum is within a critical range of said critical spectrum image at said original pump wavelength.

25. The method of claim 24, wherein said nonlinear optical frequency converter is an optical parametric amplifier, said first wavelength is a signal wavelength, and said second wavelength is an idler wavelength.

26. The method of claim 24, wherein said nonlinear optical frequency converter is an optical parametric amplifier, said first wavelength is an idler wavelength, and said second wavelength is a signal wavelength.

27. The method of claim 24, wherein said critical range commences when said critical spectrum overlaps said critical spectrum image.

28. The method of claim 24, wherein said adjusted pump wavelength is selected such that said critical spectrum and said critical spectrum image at said adjusted pump wavelength do not overlap.

29. A method of tuning an optical parametric amplifier comprising:
   a) providing a pump beam at an original pump wavelength to optical parametric amplifier to produce gain at a first wavelength;
   b) providing an input signal with an input spectrum at said first wavelength;
   c) defining an image spectrum at a second wavelength based on said input spectrum and said pump wavelength; and
   d) adjusting said original pump wavelength to an adjusted pump wavelength when said input spectrum and said image spectrum are within a critical range at said original pump wavelength.

30. The method of claim 29, wherein said first wavelength is a signal wavelength, and said second wavelength is an idler wavelength.

31. The method of claim 29, wherein said first wavelength is an idler wavelength, and said second wavelength is a signal wavelength.

32. The method of claim 29, wherein said critical range commences when said input spectrum and said image spectrum overlap.

33. A method of tuning an optical frequency converter comprising:
   a) providing a pump beam at an original pump wavelength to said optical frequency converter to drive an optical frequency conversion;
   b) providing at least one input signal with an input spectrum at a first wavelength;
   c) defining an image spectrum at at least one second wavelength based on said input spectrum and said pump wavelength; and
   d) adjusting said original pump wavelength to an adjusted pump wavelength when said input spectrum and said image spectrum are within a critical range at said original pump wavelength.

34. The method of claim 33, wherein said critical range commences when said input spectrum and said image spectrum overlap.

* * * * *